Sept. 10, 1935.　　　　J. T. CATLETT　　　　2,014,226
COMBINED ELECTRODE HOLDER AND NOZZLE FOR GAS ARC TORCHES
Filed Dec. 28, 1934
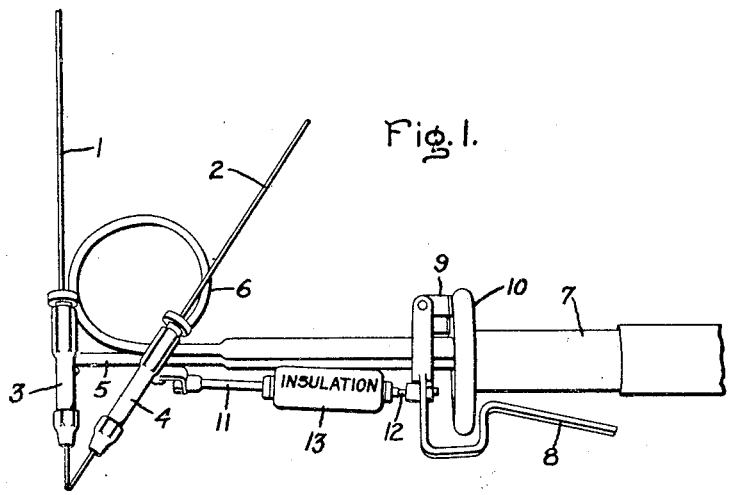
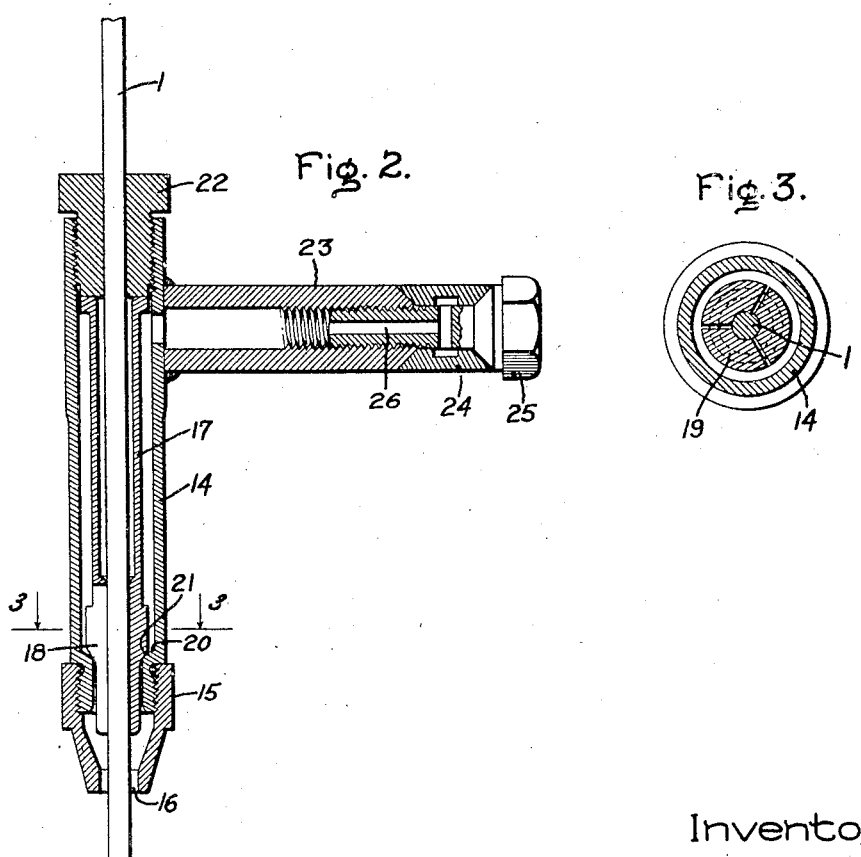
Inventor:
James T. Catlett,
by Harry E. Dunham
His Attorney.

Patented Sept. 10, 1935

2,014,226

UNITED STATES PATENT OFFICE 2,014,226

COMBINED ELECTRODE HOLDER AND NOZZLE FOR GAS-ARC TORCHES

James T. Catlett, Scotia, N. Y., assignor to General Electric Company, a corporation of New York Application December 28, 1934, Serial No. 759,516

5 Claims. (Cl. 219—8)

My invention relates to combined electrode holders and nozzles for gas-arc torches, and particularly for welding torches especially suited for the utilization of the heating effects of flames of atomic hydrogen.

An atomic hydrogen flame may be produced by dissociating hydrogen through the agency of an electric arc and then allowing the dissociated hydrogen to recombine or "burn". Upon recombination the atomic hydrogen liberates an enormous amount of heat which may be used for welding or like operations. The utilization of such atomic hydrogen flames is disclosed and claimed broadly in Letters Patent No. 1,947,267, Irving Langmuir, granted February 13, 1934. While my invention is well suited for atomic hydrogen flame welding, it is also well suited for applications where a welding medium of any suitable character is supplied about an electrode to and about the arc established at its terminal.

It is an object of my invention to provide an improved combined electrode holder and gas nozzle by means of which the electrode may be readily adjusted therein to compensate for its consumption in the arc and wherein the arrangement of parts is such as to constitute a nozzle by means of which a gaseous medium is discharged about the electrode toward its arcing terminal.

My invention will be better understood from the following description taken in connection with the accompanying drawing in which Fig. 1 is a perspective view of a gas-arc welding torch to which my invention has been applied; Fig. 2 is a sectional view of one form of the improved electrode holders and nozzles thereof embodying my invention, and Fig. 3 is a sectional view of Fig. 2 along the lines 3—3.

In the torch shown in Fig. 1 electrodes 1 and 2 are supported in combined electrode holders and gas nozzles 3 and 4 which are independently supported on tubes 5 and 6 which project from a handle 7. The electrode holder and nozzle 4 is connected to a lever 8 pivoted to a bracket 9 on the guard 10 of handle 7 by rods 11 and 12 which are connected by an insulating member 13. Movement of the lever 8 consequently moves electrode 2 supported in the electrode holder and nozzle 4 relative to the electrode 1 supported in the electrode holder and nozzle 3. This limited movement is made possible by providing tube 6 with a bent portion as illustrated which is sufficiently resilient for this purpose, and which also acts as a spring member which tends to hold the electrodes in a given position relative to one another. Electricity and gas are supplied to the combined electrode holders and nozzles 3 and 4 through the tubes 5 and 6 by means of connections at the end of the handle 7 which has not been shown in the drawing.

The construction of the combined electrode holders and nozzles 3 and 4 is illustrated in the sectional view of Fig. 2. As there illustrated, they comprise a nozzle 14 which terminates in a tip 15 which forms with the discharge end of the nozzle a chamber having a discharge opening 16 greater in size than the electrode supported therein. As illustrated the tip 15 has been made detachable by being threaded on to the discharge end of the nozzle 14. This construction is employed because it has been found necessary frequently to renew the tip because of the effects of the heat of the gas-arc flame and the spattering of weld metal which takes place during welding. Within the nozzle 14 is an electrode centering and clamping sleeve 17 having an end-portion 18 which is slotted to form clamping jaws 19 which extend into the tip 15. The nozzle 14 is provided with an internal wedging surface 20 at its discharge end and the slotted end-portion of the sleeve 17 is provided with a cooperating external wedging surface 21 at the jaws 18 so that when the sleeve 17 is forced toward the discharge end of the nozzle 14 the jaws 18 are positively forced against the electrode 1. This wedging action is accomplished through the agency of a screw 22, which acts against the unslotted end of the sleeve 17 and is threaded into the other end of the nozzle 14 forming a closure therefor through which the electrode 1 extends with a substantially gas-tight fit. It will thus be seen from what has been stated above that by advancing the screw 22 into the nozzle 14 the sleeve 17 is forced toward the discharge end of the nozzle forcing the wedging surfaces 20 and 21 together which in turn force the jaws 19 into engagement with the electrode 1 centering it and holding it in position within the nozzle 14.

Gas is supplied to the nozzle through an arm 23 which also acts as a support for the nozzle. This arm is attached to a connection 24 at the end of one of the tubes 5 or 6 of the torch by means of a cap-screw 25 which is provided with a passageway 26 extending from its side wall near its head to its tip within the arm 23. The end of the arm 23 and the head of the cap screw 25 are provided with opposed clamping surfaces which are adapted to engage the opposite sides of the T-connection 24 to form an electrical and gas-tight connection between the combined electrode and nozzle and its supporting tube through which gas and electricity are supplied thereto. It is apparent that the construction of the combined electrode tube and nozzle is such that electricity will be supplied to the electrode supported therein in view of the fact that the various parts are formed of metal and are thus conductors of electricity. Gas is supplied from the chamber within the nozzle 14 to the chamber within the tip 15 through the slotted end-portion of the sleeve 17. The gas thus supplied to the tip 15 is discharged about the electrode 1 and totally encloses its arcing terminal portion.

My invention is not limited to the particular detailed construction of the combined electrode holder and nozzle illustrated and described above and various modifications may be made therein without departing from the teachings of my invention. I aim, therefore, to cover in the appended claims all such modifications as fall within the true spirit and scope of my invention as set forth in the appended claims.

What I claim as new and desire to secure by Letters Patent of the United States is:

1. In combination a nozzle having an internal wedging surface at its discharge end, a tip attached to said nozzle at its discharge end, a clamping sleeve within said nozzle having its portion adjacent said tip slotted to form jaws extending through the discharge end of said nozzle and having an external wedging surface at said jaws cooperating with said internal wedging surface in said nozzle, and a screw threaded to said nozzle and acting against the unslotted end of said sleeve to force said wedging surfaces against one another, all of said members having a longitudinal passageway therethrough for an electrode clamped in said nozzle by said jaws, the passageway in said screw being of substantially the same diameter as said electrode and the passage through said tip being of greater size than said electrode.

2. A combined electrode holder and nozzle for gas-arc torches comprising a nozzle having an internal wedging surface at its discharge end, a tip attached to said nozzle at its discharge end with which it forms a chamber having a discharge opening greater in size than the electrode supported in said nozzle, means for supplying gas to said nozzle, and means for clamping said electrode in said nozzle, said means including a sleeve within said nozzle having its end portion adjacent said tip slotted to form jaws for an electrode extending therethrough and having an external wedging surface at said jaws cooperating with said internal wedging surface in said nozzle to form a clamp for said jaws.

3. A combined electrode holder and nozzle for gas-arc torches comprising a nozzle terminating in a tip having an opening therein of greater size than the electrode supported in said nozzle, an electrode centering and clamping sleeve in said nozzle and having a slotted end portion extending into said tip, cooperating wedging surfaces on the adjacent portions of said nozzle and said sleeve at its slotted end portion, a screw acting against the unslotted end of said sleeve to force said wedging surfaces together and threaded into the other end of said nozzle to form a closure therefor through which said electrode extends with a substantially gas-tight fit, and a supporting arm for said nozzle having a passageway therein communicating with the interior of said nozzle.

4. A combined electrode holder and nozzle for gas-arc torches comprising a nozzle terminating in a tip having an opening therein of greater size than the electrode supported in said nozzle and having an internal wedging surface at its discharge end, an electrode centering and clamping sleeve in said nozzle having an external wedging surface cooperating with said internal wedging surface in said nozzle, said sleeve being slotted to form passageways extending past said wedging surfaces and to form clamping jaws in the end of said sleeve for said electrode, a screw acting against the unslotted end of said sleeve to force said wedging surfaces together and threaded into the other end of said nozzle to form a closure therefor through which said electrode extends with substantially a gas-tight fit, and means for supplying gas to said nozzle.

5. A combined electrode holder and nozzle for gas-arc torches comprising a nozzle, a detachable tip at one end of said nozzle with which it forms a chamber having a discharge opening therein of greater size than the electrode supported in said nozzle, an electrode clamping sleeve within said nozzle having an end portion extending into said tip which is slotted to form clamping jaws for the electrode extending through said sleeve, cooperating wedging surfaces on the adjacent surfaces of said nozzle and said sleeve at said jaws, a screw acting against the unslotted end of said sleeve to force said wedging surfaces together and threaded into the other end of said nozzle to form a closure therefor through which said electrode extends with a substantially gas-tight fit, a supporting arm for said nozzle having a passageway therein communicating with the interior of said nozzle, a cap screw threaded into the end of said arm and provided with a passageway extending from its side wall near its head to its tip within said arm, said cap screw and said arm having opposed clamping surfaces adapted to engage a connection by which the nozzle is supported and through which gas is supplied to said nozzle through said cap screw and said arm.

JAMES T. CATLETT.